United States Patent [19]

Kitsuregawa et al.

[11] Patent Number: 5,079,736
[45] Date of Patent: Jan. 7, 1992

[54] HIGH SPEED PIPELINE MERGE SORTER WITH RUN LENGTH TUNING MECHANISM

[75] Inventors: Masaru Kitsuregawa, Chiba; Shinya Fushimi, Kanagawa, both of Japan

[73] Assignee: Mitsubishi Denki K.K., Tokyo, Japan

[21] Appl. No.: 357,128

[22] Filed: May 26, 1989

[30] Foreign Application Priority Data

May 26, 1988 [JP] Japan ................... 63-129023

[51] Int. Cl.$^5$ ............................................. G06F 7/36
[52] U.S. Cl. ............................... 395/600; 364/222.81; 364/222.9; 364/231.8; 364/229
[58] Field of Search ................... 340/146.2; 364/200 MS File, 900 MS File

[56] References Cited

U.S. PATENT DOCUMENTS

| | | | |
|---|---|---|---|
| 3,713,107 | 1/1973 | Barsamian | 364/200 |
| 4,078,260 | 3/1978 | Chen | 364/900 |
| 4,209,845 | 6/1980 | Beger | 364/900 |
| 4,425,617 | 1/1984 | Sherwood | 364/200 |
| 4,464,732 | 8/1984 | Clark | 364/900 |
| 4,514,826 | 4/1985 | Iwata | 364/900 |
| 4,575,798 | 3/1986 | Lindstrom | 364/300 |
| 4,799,152 | 1/1989 | Chuang | 364/200 |
| 4,873,625 | 10/1989 | Archer | 364/200 |
| 4,991,134 | 2/1991 | Ivsin | 364/900 |

OTHER PUBLICATIONS

Kitsuregawa et al., "Design and Implementation of High Speed Pipeline Merge Sorter with Run Length Tuning Mechanism", *Data Base Machines and Knowledge Base Machines*, pp. 89-102, (1988).

Primary Examiner—Thomas C. Lee
Assistant Examiner—Eric Coleman
Attorney, Agent, or Firm—Kanesaka & Takeuchi

[57] ABSTRACT

A control data generator for a sort processor includes a control data output unit which consists of a storage unit for storing information about the length of input data and a control data generation unit responsive to the stored information to generate control data for switching each sort processor between the first function and the second function, whereby control data is generated without using any programs.

3 Claims, 6 Drawing Sheets

HIGH SPEED PIPELINE MERGE SORTER WITH RUN LENGTH TUNING MECHANISM

BACKGROUND OF TGHE INVENTION

This invention relates to control data generators for sort processors for sorting a great number of data according to a specified order.

A conventional control data generator for a sort processor such as shown in FIG. 1 of the Proceedings of the Japanese Electronic Communications Society, J66-D, March 1983, p 333, is shown in FIG. 6. The control data generator includes four sort processors 1-4, four memories 5-8 each corresponding to each sort processor, and an indicator 9 for the length (L) of data set by the sort processor. The i-th sort processor from left is provided with a memory which has a capacity of $2^{i-1}L$.

In operation, the data to be sorted is sequentially input into the sort processor 1. The sort processor 1 stores one of the input data in the memory 5 and compares it with the next input data. For sorting in descending order, the sort processor 1 first outputs the greater one between the two data and then the smaller one to the next sort processor 2. This operation is repeated in the sort processor 1.

The sort processor 2 stores the descending order 2-data set in the memory 6, in which the two data are sorted in descending order, and merges it with the next input descending order 2-data set to output a descending order 4-data set to the sort processor 3. This operation is repeated in the sort processor 2.

Generally, the i-th sort processor merges the descending order $2^{i-1}$-data set sent from the (i−1)th sort processor to output a descending order $2^i$-data set to the (i+1)th sort processor. This operation is repeated in the i-th sort processor. Thus, when N ($=2^n$) data are input, the n-th sort processor outputs a descending order N-data set sorted.

The above operation, however, is possible only if the length (X) of data to be sorted is either equal to or less than the length (L) of data set by the sort processor.

In accordance with the Proceedings of the 5th international Workshop on Database Machines, October 1986, p 144, even if the input data length (X) is greater than the set data length (L), it is possible to sort a great number of such data by dynamically switching the first sort processor 1 between the MRG mode in which merge is carried out as described above and the NM mode in which no merging operation is performed, with the input data directly transmitted to the sort processor 2, depending on the input data length (X) to thereby use the memories 5-8 more efficiently.

For example, let X=1.1 L in the descending order sorting. Since the capacity of the memory 8 for the sort processor 4 is 8 L, it is possible to store seven data in the memory as follows:

8 $L/X$=8$L$/1.1$L$=7.27...=7 (integer part).

The sort processor 3 outputs a descending order 7-data set having a data length of 7 to the sort processor 4 and repeats this operation. The sort processor 2 repeats outputting a descending order 3-data set and a descending order 4-data set to the sort processor 3. The sort processor 1 repeats outputting descending order 1-data, 2-data, 2-data, and 2-data sets to the sort processor 2. These operations are shown in FIG. 5.

In FIG. 5, th data 17-30 to be input to the sort processor are shown in the inputting order. Symbols NM 31 and MRG 32-37 indicate that the sort processor 1 is brought into control in the NM mode for data 17 and 24 and into the MRG mode for data 18, 25, etc., respectively. The value (n) of a descending order n-data set to be generated by the sort processor 3 is shown at 10. Similarly, the values (n) of descending order n-data sets to be generated by the sort processor 2 are shown at 11 and 12. The values (n) of descending order n-data sets to be generated periodically by the sort processor 1 are shown at 13-16. The sort processors 1, 2, and 3 in FIG. 6 are represented by P1, P2, and P3.

In this way, the third sort processor 3 always outputs a descending order 7-data set to the fourth sort processor 4. Thus, with the control data generator for a sort processor of FIG. 6, it is possible to sort 14 data under the above conditions. However, the procedure of generating the control data is so complex that there are no ways but by programming. As a result, the sorting capability has been impaired.

SUMMARY OF THE INVENTION

Accordingly, it is an object of the invention to provide a control data generator for a sort processor which requires no programs for generating the control data and is made of simple and inexpensive hardware to efficiently generate the control data, thus providing the increased sorting capability.

According to the invention there is provided a control data generator for a sort processor, which includes a memory for storing information about the length of input and a control data generation unit responsive to the information from the memory to generate control data for switching each sort processor between the first and second functions.

The above and other objects, features, and advantages of the invention will become more apparent from the following description when taken in conjunction with the accompanying drawings.

DESCRIPTION OF THE PREFERRED EMBODIMENT

Figure 1:
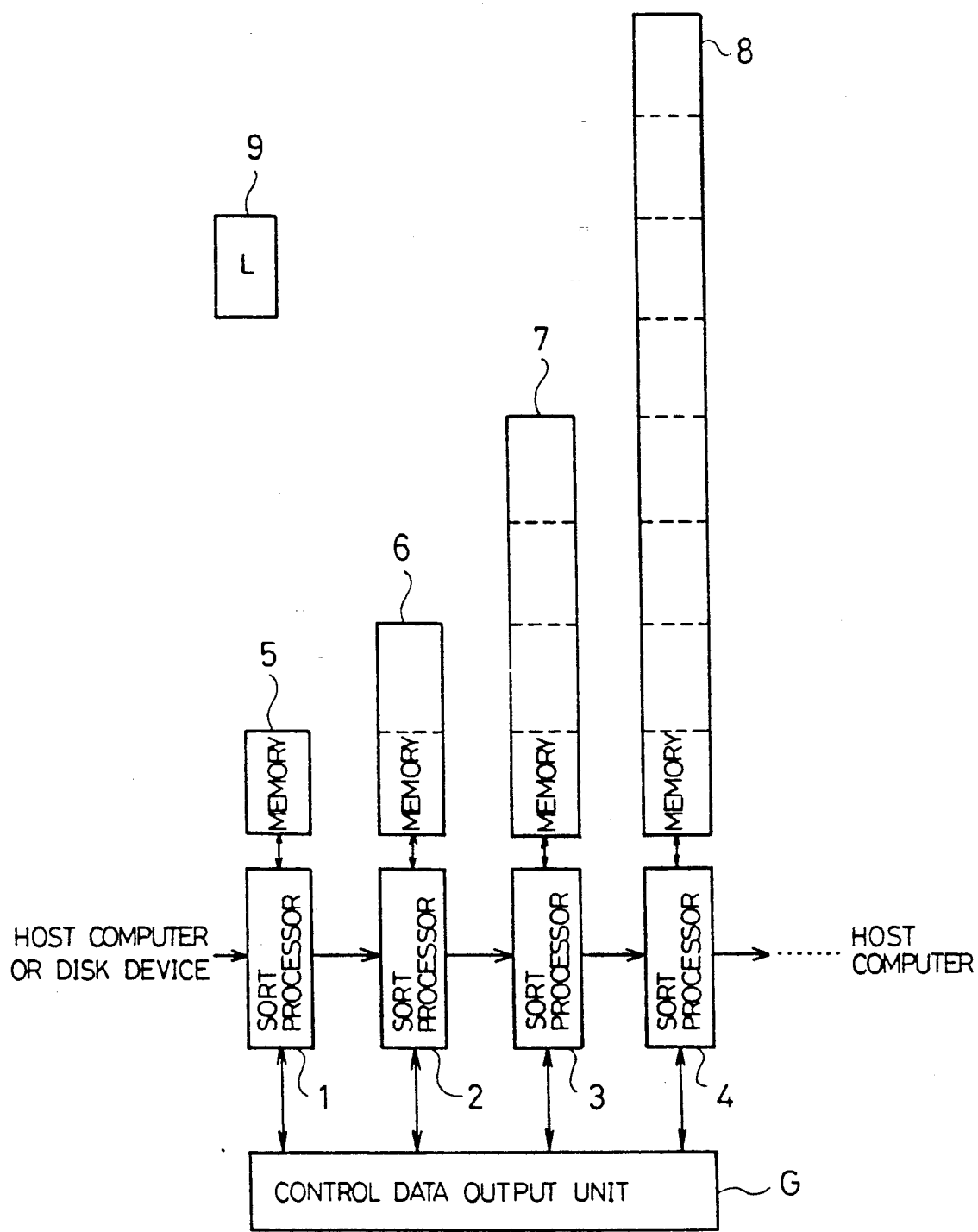
FIG. 1 is a block diagram of a control data generator for a sort processor according to an embodiment of the invention.
Figure 6:
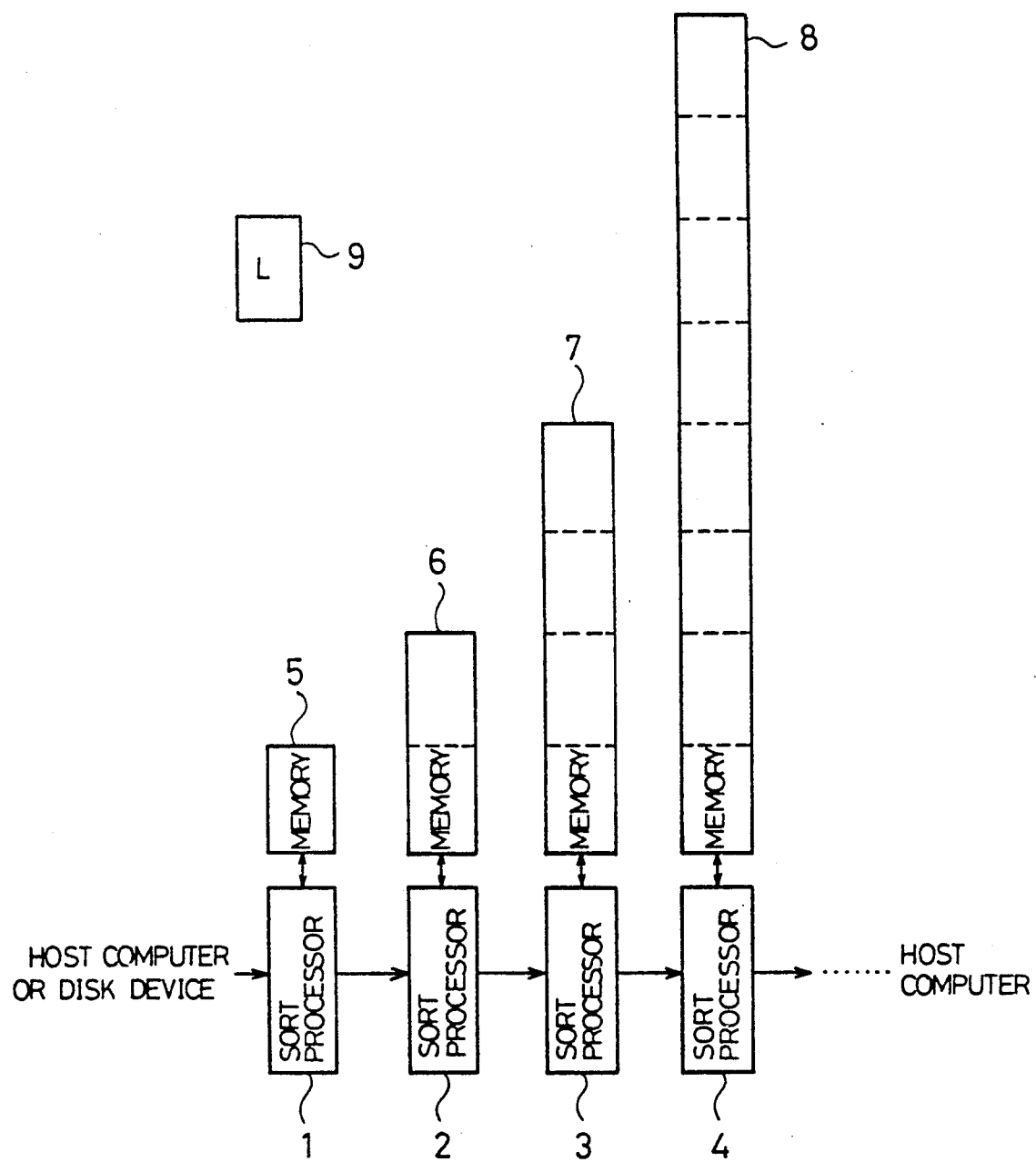
FIG. 6 is a block diagram of a conventional control data generator for a sort processor.

In FIG. 1, like reference numerals designate like or corresponding parts of FIG. 6. This control data generator further includes a control data output unit G.

Figure 2:
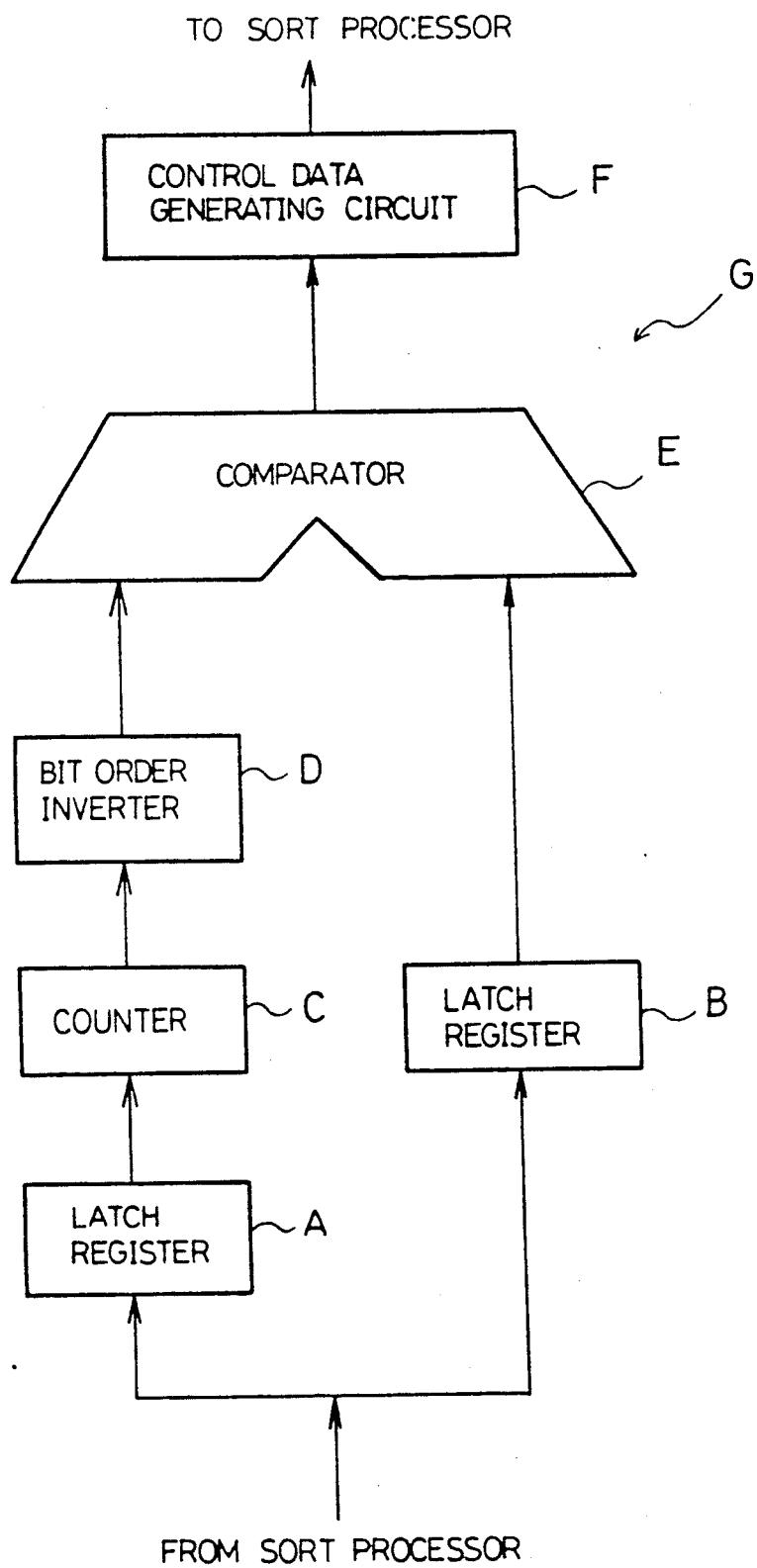
FIG. 2 is a block diagram of a control data output unit for use in the control data generator of FIG. 1.
Figure 3:
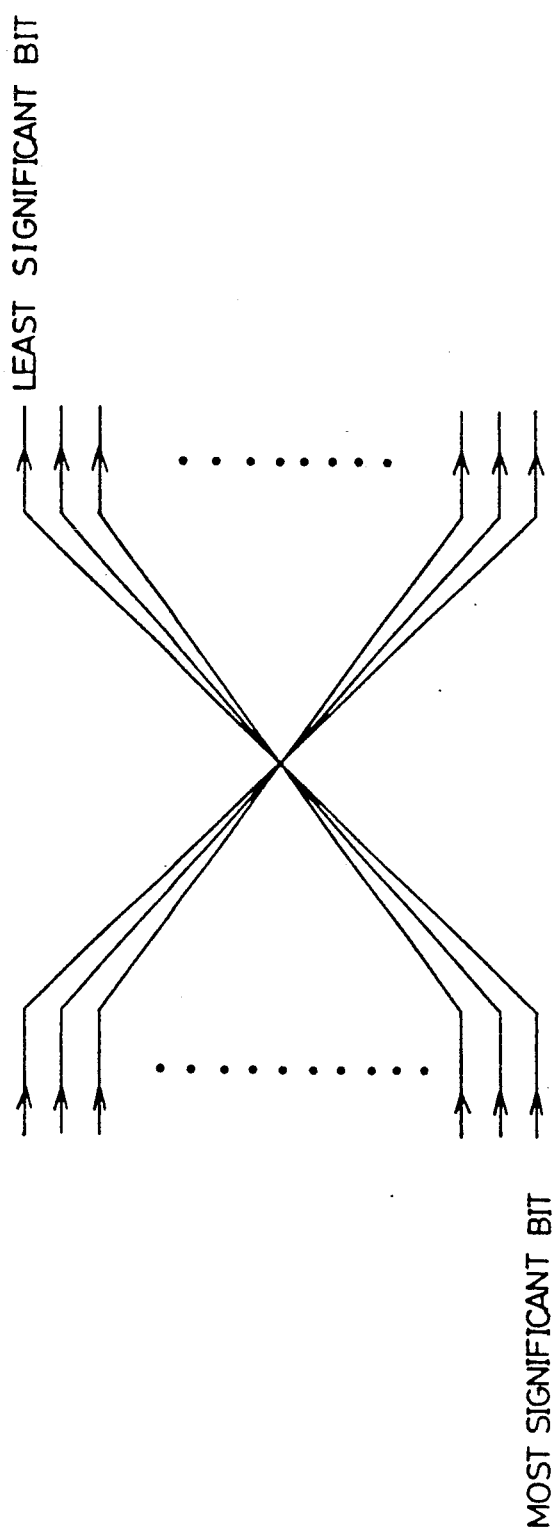
FIG. 3 illustrates how to invert the bit order by the bit order inverter of FIG. 2.

In FIG. 2, the control data output unit G includes a pair of latch registers A and B for storing information about the length of data input from a disk device, etc., a counter C for counting the output of the latch register A, a bit order inverter D for converting the most significant bit to the least significant bit of an output from the counter C, the second MSB to the second LSB, and so on as shown in FIG. 3, a comparator E for comparing the output of the bit order inverter D with the output of the latch register B, and a control data generating circuit F for generating control data based on the output of the comparator E.

The control data is used for switching between the first function or NM mode in which the input data is stored in the corresponding memory for outputting without merging and the second function or MRG mode in which the input data is merged in the specified order and outputted from the corresponding memory for later use. Each sort processors 1-4 has both the NM mode and the MRG mode. The comparator E of FIG. 2 is designed to output a logic 0 when a signal from the bit order inverter D is greater than a signal from the latch register B and otherwise a logic 1.

In operation, when the input data length (X) from a disk device, etc. is greater than the set data length (L) in the sort processor (X>L), a d-th sort processor from left in FIG. 1 is selected to compute a value of $[2^d L/X]$. $(2^e-1)$ and $\alpha$ are stored in the latch registers A and B, respectively, wherein $[2^d L/X] = 2^e + \alpha (0 < \alpha < 2^e)$. Then, the control data output unit G starts generating control data and sends the control data to the $(d-e)$th processor from left. All of $(d-e-1)$ processors to the left are in the NM mode while the $(d-e+1)$th and all subsequent processors are in the MRG mode. However, these may be solved in each sort processor by setting the initialization and default operation in the MRG mode as described in the aforementioned literature, and their description is omitted herein.

When the control data is generated, the data is transferred from the latch register A to the counter C for counting. The data from the counter C is inverted in bit order by the bit order inverter D and then compared in the comparator E with the data from the latch register B. The control data generating circuit F outputs control data indicative of the NM mode if the comparison result is a logic 1 and control data indicative of the MRG mode for the present and next input data if the comparison result is a logic 0.

When the inputting operation for the data is completed, the content of the counter C is decreased by 1. When this content becomes negative, it is transferred from latch register A to the counter C. A similar process is repeated for recorded data from a disk device, etc. The control data from the control data generating circuit F is transferred to the selected sort processor so that the sort processor operates according to the control data. Hence, the data input from a disk device, etc. is sorted by the sort processor and transmitted to a host computer, etc.

Figure 4:
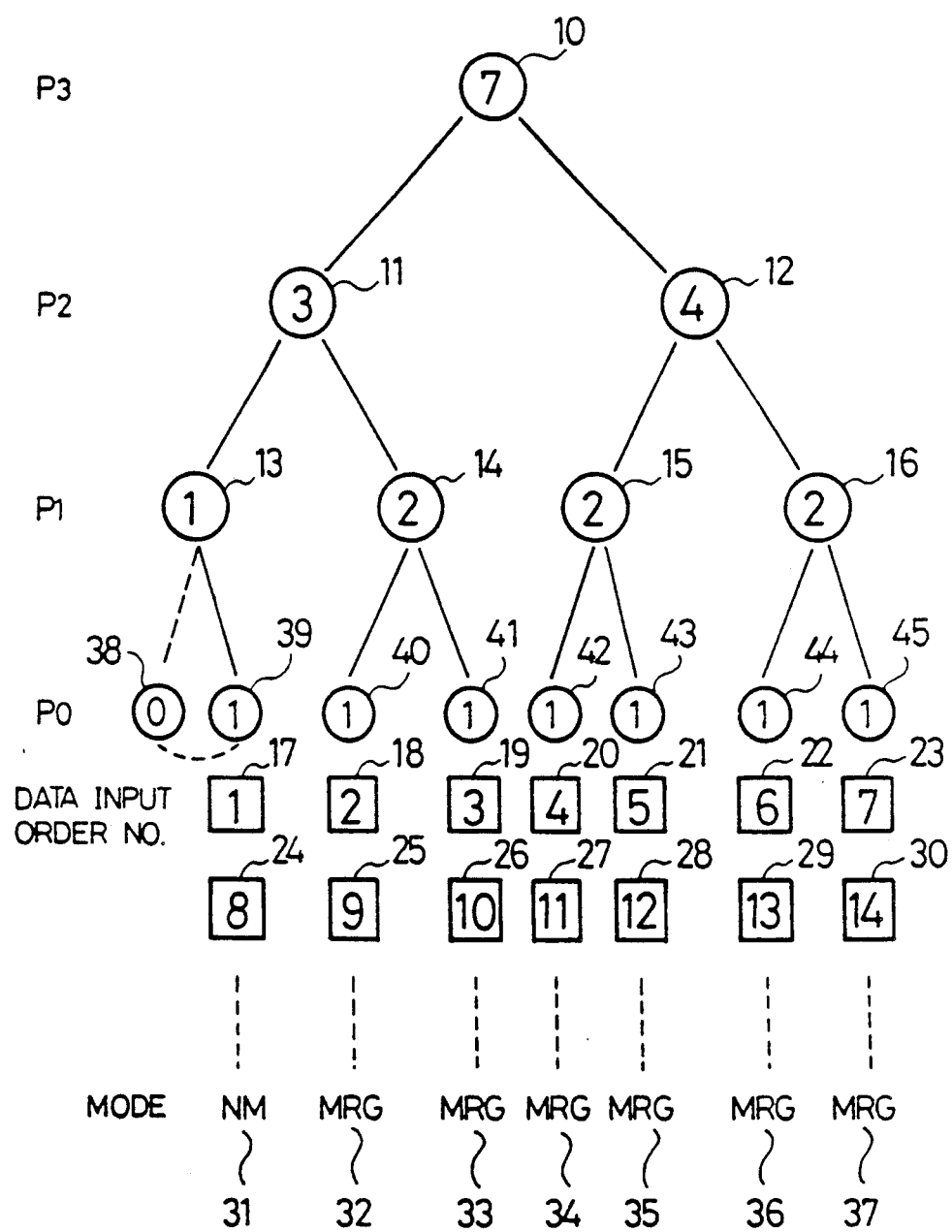
FIG. 4 illustrates how to generate and process control data according to another embodiment of the invention.
Figure 5:
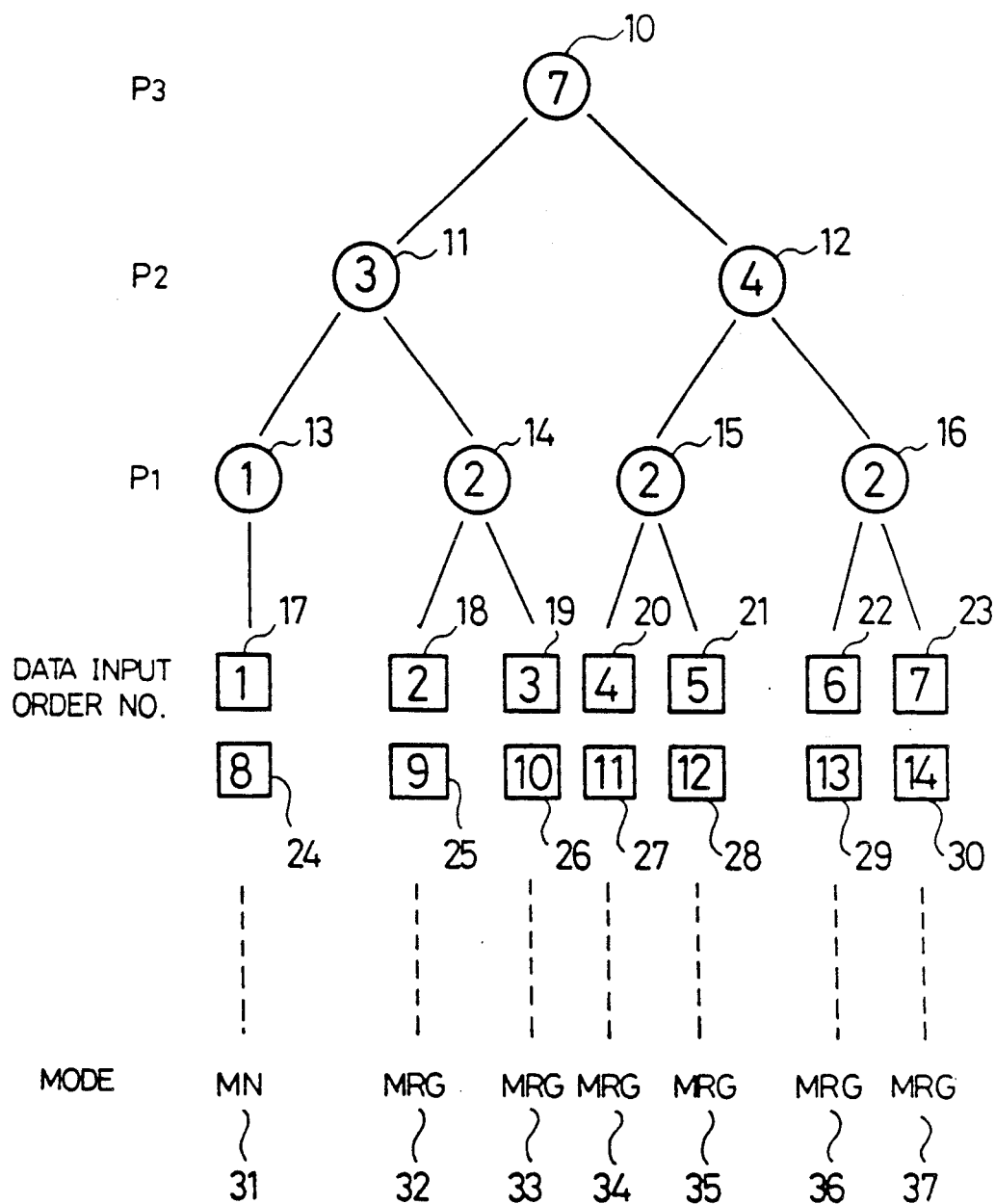
FIG. 5 illustrates how to generate and process control data according to the prior art and the embodiment of FIG. 1.

Although the values 13-16 of FIG. 5 are discussed in the above embodiment, an imaginary sort processor Po may be provided to generate the corresponding values 38-45 as shown in FIG. 4. In this case, $2^f$ and $\alpha$ are stored in the latch registers A and B, respectively, wherein $[2^d L/X] = 2^f - \alpha (0 < \alpha < 2^f)$. The counter C is an increment counter with the initial value of 0. The comparator E is modified to output a logic 1 if a value of the data from the bit order inverter D is less than a value of the data from the latch register B and otherwise a logic 0. The control data generating circuit F outputs control data about the NM mode if the data of the comparator E is a logic 1 and otherwise control data about the MRG mode. The counter C is incremented by 1 when the process of each data is completed and if the comparator E outputs a logic 1, and reset to 0 if the result becomes greater than a value of the latch register A. The above configuration produces the same results as those of FIG. 5.

Alternatively, the control data output unit G may be connected to only the first sort processor 1 in FIG. 1, and control data may be sequentially transferred from the first sort processor 1 to the second sort processor 2 to the third sort processor 3 along with the input data to thereby simplify the connection between the control data generating unit and the sort processor.

As has been described above, in accordance with the invention, the control data generator for a sort processor includes a control data output unit which consists of a meemory for storing information about the input data length and a control data generation circuit for generating control data to make switching between the first and second functions based on the information from the memory, whereby control data is generated efficiently by the simple and inexpensive hardware without using any control data generation program, thus providing the enhanced sorting capability regardless of the data length.

What is claimed is:

1. A high speed pipeline merge sorter with a run length tuning mechanism, which comprises:

a plurality of memories for storing input data;

a plurality of sort processors each connected to each said memory and having a first function for storing in and outputting from said each memory input data without merging and a second function for merging input data in a specified order and outputting said merged input data from said each memory:

a pair of storage means A and B connected to said sort processors for storing information about the length of said input data; and control data generation means connected said storage means A and B for generating control data to set said sort processor in said fist function when the length of said input data in storage means A is equal to or greater than that of said storage means B and said second function when the length of said input data in said storage means A is less than that of said storage means B, thereby switching said sort processor between said first and second functions based on said information stored in said storage means.

2. The high speed pipeline merge sorter with a run length tuning mechanism of claim 1, wherein said storage means A and B are a pair of latch registers (A) and (B).

3. The high speed pipeline merge sorter with a run length tuning mechanism of claim 2, wherein said control data generation means comprises:

a counter (C) connected to said latch register (A) for counting data of said latch register (A), a bit order inverter connected to said counter (C) for converting at least the most significant bit into the least significant bit of an output signal from said counter (C); and a comparator connected to said bit order inverter and said latch register (B) for comparing an output of said bit order inverter with an output of said latch register (B) to output a logic value for controlling said control data generation means.

* * * * *